Patented Aug. 8, 1950

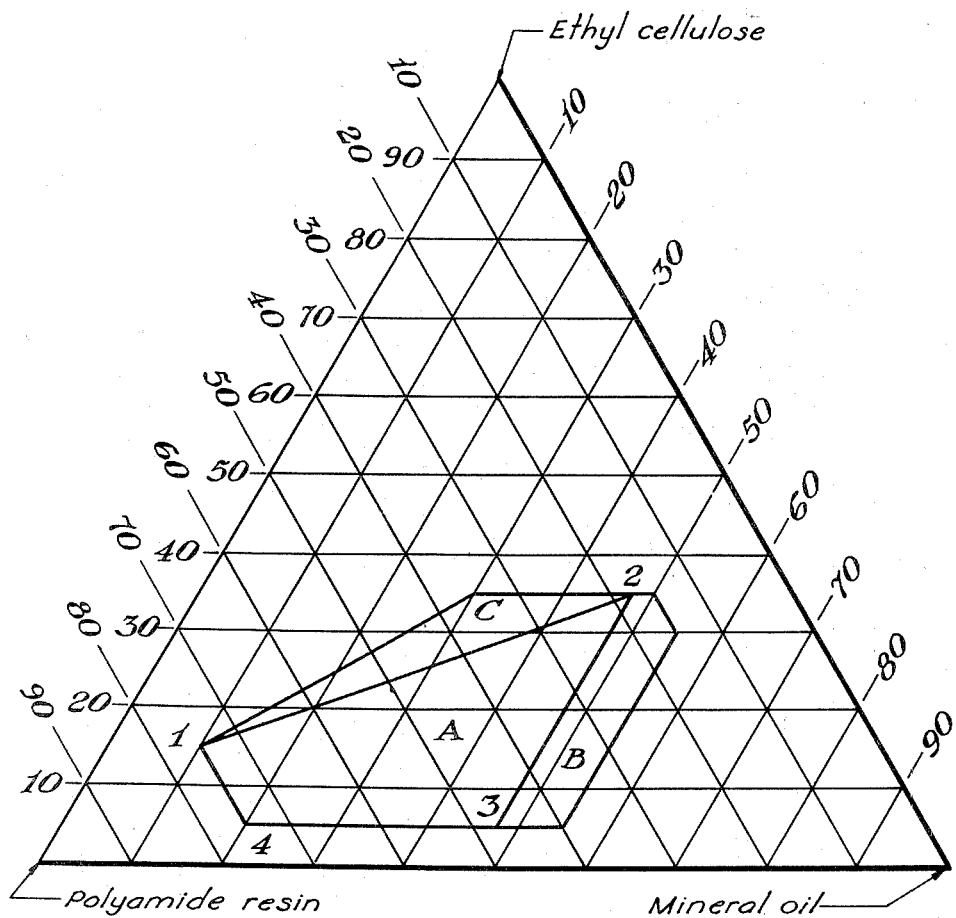

2,517,754

UNITED STATES PATENT OFFICE 2,517,754

HOT-MELT COATING COMPOSITION

Arthur E. Young and Kenneth D. Bacon, Midland, Mich., assignors to The Dow Chemical Company, Midland, Mich., a corporation of Delaware Application November 13, 1945, Serial No. 628,300

2 Claims. (Cl. 106—186)

This invention relates to a composition of matter for use primarily as a coating composition and is especially concerned with such a coating which is applied from the molten condition. Compositions of this type have become known as "hot-melts" and the latter term will be employed herein in connection with the present composition. The invention relates in particular to a wax-free hot-melt coating composition having good heat-sealing characteristics and being capable of use in connection with food packages.

Most of the hot-melt coatings heretofore known have contained a mineral wax or an ester wax, or both, as essential ingredients. For many purposes these predominantly waxy compositions have been perfectly satisfactory. Some of the waxes commonly used in waxy melts have objectionable odors, even at low temperatures. A few hot-melt compositions are known which do not contain wax, but most of these are objectionable from the standpoint of color or odor or moisture vapor transmission, and because of their defects cannot be used satisfactorily in connection with food packaging operations. Because of the weak seal formed between two sheets of waxed (paraffin coated) paper such as is commonly used for food packaging, an end-sealing label coated with a heat-sealing wax-free melt is desirable to provide a stronger bond than is possible with the paraffin coating alone.

It is an object of the present invention to provide a wax-free hot-melt coating composition satisfactory for use in food packaging operations and having a suitably low viscosity at the normal temperatures of application to permit easy distribution of the material over the paper surface being coated. A related object is to provide such a composition which will form the desirably perfect heat-seal on food packages when applied with the standard sealing apparatus. A particular object is to provide a wax-free hot-melt coating composition which can be applied to the end labels of bread wrappers and which will adhere and form a perfect seal with any of the usual bread wrapping sheets, whether these sheets are "wax paper" (paraffin coated), plain paper, or regenerated cellulose. A related object is the provision of a composition of the type mentioned above which is free from odors which would be objectionable in the food industry. Other and related objects may become apparent from the following description.

We have now discovered a new and useful and particularly advantageous wax-free hot-melt coating composition composed essentially of ethyl cellulose, mineral oil, and an ethylene diamine polyamide of polymerized linoleic and linolenic acid. The proportions and particular specifications of the three essential ingredients will be described more fully hereinafter.

The ethyl cellulose employed in the present composition is that standard product having an ethoxyl content in the range from about 47.5 to about 50 per cent. It should be a low viscosity material and for the present purposes is preferably one whose 5 per cent solution by weight in a mixture of 80 parts of toluene and 20 parts of ethanol has a viscosity of less than 30 centipoises. The amount of ethyl cellulose employed in the new compositions is at least 5 per cent and is in no case greater than 35 per cent.

The mineral oil employed in the present composition is a refined oil, suitably light colored or water-white, and possibly of pharmaceutical grade, or equivalent. Such an oil may advantageously be one which is derived from a naphthenic petroleum source. Examples of suitable oils not of pharmaceutical quality are those supplied under the trade-name "Necton." The Necton oils are pale oils which have been purified by a phenol extraction process. The oils which have been found most satisfactory are those having a viscosity in the range from about 40 to about 100 Saybolt units at 210° F. It is not to be inferred that only naphthenic oils may be used, but it is understood that these materials are somewhat more compatible with ethyl cellulose in the entire composition than are the purely paraffinic oils. The amount of mineral oil employed is never less than 10 per cent of the weight of the three essential components of the composition and is preferably no greater than about 47.5 per cent of the weight of these three components. By proper selection of the oils and other ingredients, it has been possible on occasion to employ as much as 55 per cent of mineral oil but this leads ordinarily to the formation of compositions which tend to exude oil and which are accordingly considered to be unsatisfactory for many packaging purposes.

The polyamide resin employed is one having a molecular weight in the range from about 3000 to about 5000 and is chemically an ethylene diamine polyamide of dimerized and trimerized linoleic and linolenic acids. Such a product has been discovered by the Northern Regional Research Laboratory of the United States Department of Agriculture at Peoria, Illinois, and given the name of "Norelac." This material is commercially available from General Mills, Inc., Minneapolis, Minnesota, under the designation "General Mills Polyamide Resin." For simplicity of description, such resin will hereinafter be referred to simply as the polyamide resin. With certain exceptions, to be defined, the amount of polyamide resin employed in the present composition, based on the weight of the three essential components, is at least 17.5 per cent and not over 75 per cent.

It would be inaccurate to state simply that the composition may contain from 5 to 35 per cent of ethyl cellulose, from 10 to 47.5 per cent of the mineral oil, and from 17.5 to 75 per cent of the polyamide resin, since these proportions would encompass numerous compositions which are either too viscous for practical application or are too oily for the present purpose, except under particular conditions to be detailed hereinafter. Other compositions within the broad range ordinarily do not have the required adhesiveness and some of them show too great a tendency to "block." The most generally operative proportions within the range expressed above are clearly represented in the accompanying drawing by the area designated as A. All of the new ternary compositions falling within area A on the accompanying drawing have a satisfactory viscosity at the temperatures normally employed for the application of hot-melt coatings, all of them form non-tacky deposits having excellent adhesion, none of them block at temperatures up to 120° F. when two or more sheets are stacked under a pressure of two pounds per square inch, and none of them form tacky coatings on paper. With certain exceptions, compositions falling above and to the left of line 1—2 on the drawing are too viscous for practical application. Similarly, and with certain other exceptions, compositions falling below and to the right of line 2—3 are too oily for practical use, as are many of the compositions falling below line 3—4. The ternary compositions falling below and to the left of line 4—1 are of variable characteristics, some of them being too brittle and others too viscous for the intended use.

Since compositions consisting solely of ethyl cellulose and oil are completely non-adhesive, the apparent function of the polyamide resin in the composition is that of providing adhesion and of contributing block resistant qualities to the composition. We were surprised to discover that the introduction of as little as 17.5 per cent of the polyamide resin into an ethyl cellulose-oil mixture provided a heat-sealing, non-blocking composition.

Since the lowest priced ingredient of the ternary composition is the mineral oil, and since sealing compositions for use in the food wrapping industry are highly competitive on a price basis, it is apparent that the desired compositions are those containing the maximum amount of oil. Binary compositions of the polyamide resin and of oil will form good seals only up to about 20 per cent of oil in the mixture. We have further found, and the accompanying drawing indicates, that the addition of as little as 5 per cent of ethyl cellulose increases the tolerance for oil to as much as 47.5 per cent. If it is desired to increase the oil content of the ternary composition to a value above 47.5 per cent, it becomes necessary to select an oil having viscosity between 75 and 100 Saybolt units at 210° F. With such an oil, satisfactory compositions can be prepared having as much as 30 to 35 per cent ethyl cellulose, 55 per cent of oil, and as little as 15 per cent of the polyamide resin. This modification and extension of the basic composition is defined by area B on the accompanying drawing.

The compositions of the invention have been described as ternary compositions of the three named ingredients. It should be apparent that these may be modified for particular purposes, as desired, by the incorporation of thermostable non-setting resins, or of plasticizers, or both. Such modification of the composition would normally be carried out only to accomplish certain particular changes in properties in a manner which, it is believed, would be well known in the coating art. Thus, certain resinous ingredients might be added to harden the composition and certain plasticizers might be added to produce the opposite effect of softening or flexibilizing the deposited coating. The amount of resin or of plasticizer, or both, which may be added to the basic composition may be as high as 40 per cent of the total weight of the modified composition without losing the advantages inherent in the ternary mixture herein described and claimed.

In addition to the compositions represented by the areas A and B on the accompanying drawing, various modified compositions have been prepared containing resins or plasticizers or both and have been found satisfactory when applied as hot-melts to paper intended for use in the food wrapping industry. A few illustrative examples of such compositions are listed below. The products identified in the examples as "Polypale esters" are believed to be the esters of polymerized rosin with such polyhydric alcohols as ethylene glycol (No. 1), and diethylene glycol (No. 2). The product identified as "Staybelite" is understood to be hydrogenated rosin. The product identified as "Lewisol–2L" is believed to be a maleic anhydride-modified ester gum, and has a softening point (measured on a melting point bar) of 80–82° C. and a melting point of 92–102° C.

*Table*

| | | | | | | | | | |
|---|---|---|---|---|---|---|---|---|---|
| Ethyl Cellulose (20 cps., standard) | 20 | 20 | 15 | 20 | 20 | 20 | 20 | 20 | 15 | 14 |
| Mineral Oil: | | | | | | | | | | |
| Necton 78 | 30 | 30 | | | | | 20 | 30 | | 17.5 |
| Necton 45 | | | 12.75 | 40 | 35 | 40 | | | 21.25 | |
| Polyamide Resin (Norelac) | 20 | 20 | 59.5 | 20 | 25 | 20 | 20 | 20 | 42.5 | 30 |
| Polypale Ester No. 1 | 25 | 15 | | 15 | 10 | 20 | 35 | 12.5 | | |
| Polypale Ester No. 2 | | 10 | | | | | | 12.5 | | |
| Staybelite | | | 12.75 | | | | | | 21.25 | |
| Lewisol–2L | | | | | | | | | | 28 |
| Diamyl Phthalate | 5 | 5 | | 5 | 10 | 5 | 5 | 5 | | 10.5 |

When the relative proportions of ethyl cellulose, mineral oil, and polyamide resin are considered in the modified compositions set forth in the preceding table, it is observed that some of these compositions fall above and to the left of line 1—2 in the accompanying drawing. This extension of the range of the basic ternary compositions, suitable for use in the described polynary compositions, is designated on the drawing as area C. It is to be understood that, while ternary compositions falling in area C are too viscous for the intended purpose, modifications may be made of such composition by the introduction of the suggested or other resinous or plasticizing ingredients to reduce the viscosity and to provide useful coating compositions. In any case, the described polynary compositions contain at least 60 per cent of the three principal ingredients: ethyl cellulose, polyamide resin, and oil.

The compositions which have been described have a high resistance to moisture vapor transmission and represent a new approach to the provision of heat-sealing coated papers satisfactory for use in the food wrapping industry. The new compositions meet, to an unpredictably great extent, the long felt need for a wax-free coating for particular applications in this field.

We claim:

1. A wax-free hot-melt coating composition consisting essentially of an ethyl cellulose, having an ethoxyl content of 47.5 to 50 per cent and a viscosity of less than 30 centipoises when measured on a 5 per cent solution thereof, by weight, in a mixture of 80 parts toluene and 20 parts ethanol, a pale, refined mineral oil having a viscosity between about 40 and about 100 Saybolt units at 210° F., and an ethylene diamine polyamide of a partially polymerized acid selected from the group consisting of linoleic and linolenic acids, having a molecular weight in the range from about 3000 to about 5000, the proportions of the three ingredients being represented by the area A on the accompanying drawing.

2. A wax-free hot-melt coating composition consisting essentially of an ethyl cellulose, having an ethoxyl content of 47.5 to 50 per cent and a viscosity of less than 30 centipoises when measured on a 5 per cent solution thereof, by weight, in a mixture of 80 parts toluene and 20 parts ethanol, a pale, refined mineral oil having a viscosity between about 75 and about 100 Saybolt units at 210° F., and an ethylene diamine polyamide of a partially polymerized acid selected from the group consisting of linoleic and linolenic acids, having a molecular weight in the range from about 3000 to about 5000, the proportions of the said ingredients being defined by any point falling within the combined areas A and B in the accompanying drawing.

ARTHUR E. YOUNG.
KENNETH D. BACON.

REFERENCES CITED

The following references are of record in the file of this patent:

UNITED STATES PATENTS

| Number | Name | Date |
|---|---|---|
| 2,139,679 | Hardy | Dec. 13, 1938 |
| 2,216,827 | Mitchell | Oct. 8, 1940 |
| 2,249,280 | Koch | July 15, 1941 |
| 2,285,178 | Thinius | June 2, 1942 |
| 2,379,413 | Bradley | July 3, 1945 |

OTHER REFERENCES

"Modern Plastics," May 1945, pages 125, 126 and 192.

Dow "Ethocel," Bulletin No. 2 (1937), page 13.

Cowan et al.: "Oil Soap," 21 (April 1944), pages 101 to 107.